(12) United States Patent
Kamimura et al.

(10) Patent No.: US 11,105,436 B2
(45) Date of Patent: Aug. 31, 2021

(54) PIPE ALIGNMENT MECHANISM OF BUTTERFLY VALVE

(71) Applicant: ASAHI YUKIZAI CORPORATION, Miyazaki (JP)

(72) Inventors: Shinobu Kamimura, Miyazaki (JP); Takashi Nasu, Miyazaki (JP)

(73) Assignee: ASAHI YUKIZAI CORPORATION, Miyazaki (JP)

( * ) Notice: Subject to any disclaimer, the term of this patent is extended or adjusted under 35 U.S.C. 154(b) by 0 days.

(21) Appl. No.: 16/957,623

(22) PCT Filed: Dec. 20, 2018

(86) PCT No.: PCT/JP2018/046968
§ 371 (c)(1),
(2) Date: Jun. 24, 2020

(87) PCT Pub. No.: WO2019/131430
PCT Pub. Date: Jul. 4, 2019

(65) Prior Publication Data
US 2021/0054945 A1 Feb. 25, 2021

(30) Foreign Application Priority Data
Dec. 26, 2017 (JP) .............................. JP2017-248720

(51) Int. Cl.
*F16K 1/22* (2006.01)
*F16K 27/02* (2006.01)

(52) U.S. Cl.
CPC ............ *F16K 27/0218* (2013.01); *F16K 1/22* (2013.01)

(58) Field of Classification Search
CPC ...... F16K 27/0218; F16K 27/00; F16K 27/02; F16K 31/602; F16K 1/22; F16K 1/221; F16K 1/224
See application file for complete search history.

(56) References Cited

U.S. PATENT DOCUMENTS 9,709,185 B1 * 7/2017 Kuo ........................ E03C 1/04
2020/0049079 A1 * 2/2020 Lee, II .................. F02D 9/1065

FOREIGN PATENT DOCUMENTS

| JP | H0545344 U | * | 6/1993 |
| JP | H0614644 U | * | 2/1994 |
| JP | 2002161987 A | * | 6/2002 |

OTHER PUBLICATIONS

Translation of JP-2002161987-A (Year: 2021).*
Translation of JP-H0614644-U (Year: 2021).*
Translation of JP-H0545344-U (Year: 2021).*

* cited by examiner

*Primary Examiner* — Kelsey E Cary
(74) *Attorney, Agent, or Firm* — Rankin, Hill & Clark LLP

(57) ABSTRACT

Provided is a butterfly valve pipe alignment mechanism configured so that favorable usability can be provided and an alignment process in plumbing can be easily performed. In the present invention, a groove (10) into which a positioning tool (11) is to be inserted is provided at a portion below a top flange (6). An end surface position of the groove (10) is on a plane on which a pipe flange (7) and a valve box (1) are joined to each other. The groove (10) is drilled in an elongated oval shape, and groove step portions (10*a*, 10*b*, 10*c*) projecting in both directions of a lateral direction are formed at multiple positions of the groove (10) so that the groove (10) can accept various flange connection standards.

21 Claims, 22 Drawing Sheets

[fig.1]
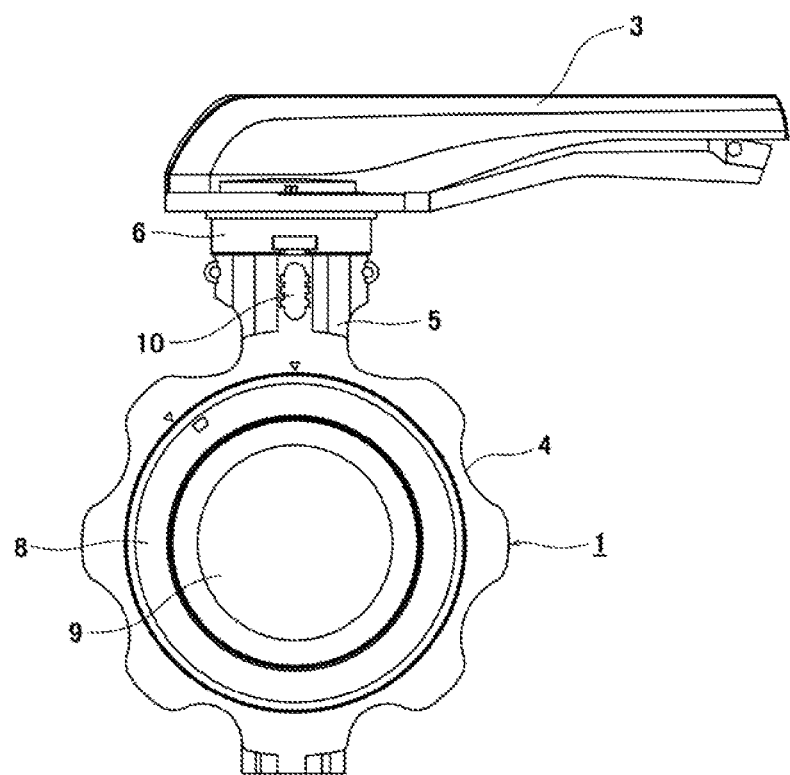

[Fig.2]
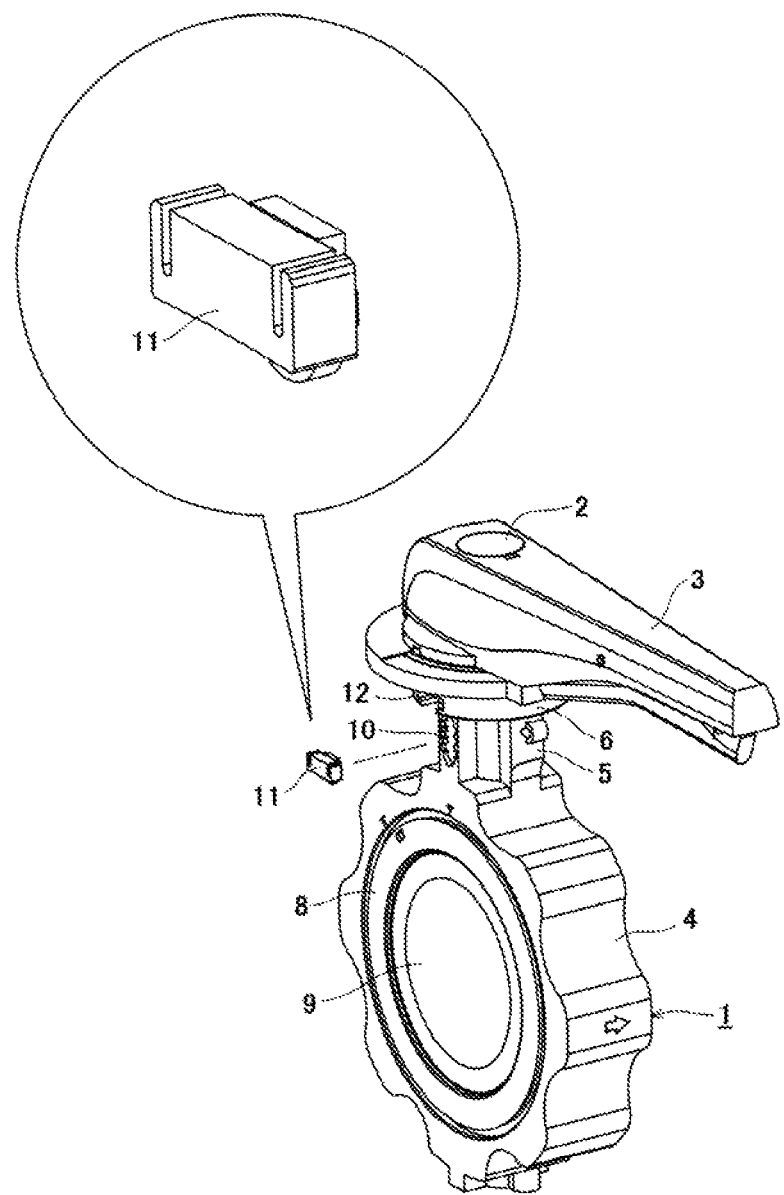

[fig.3]
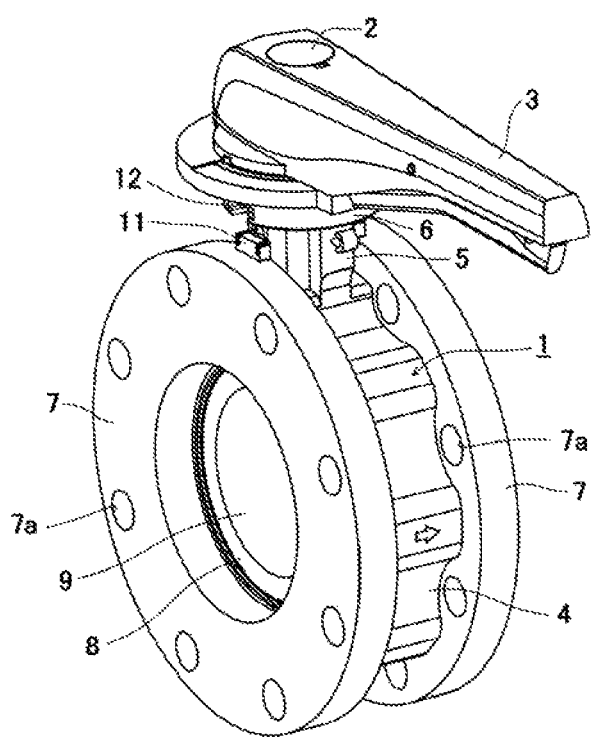

[fig.4]
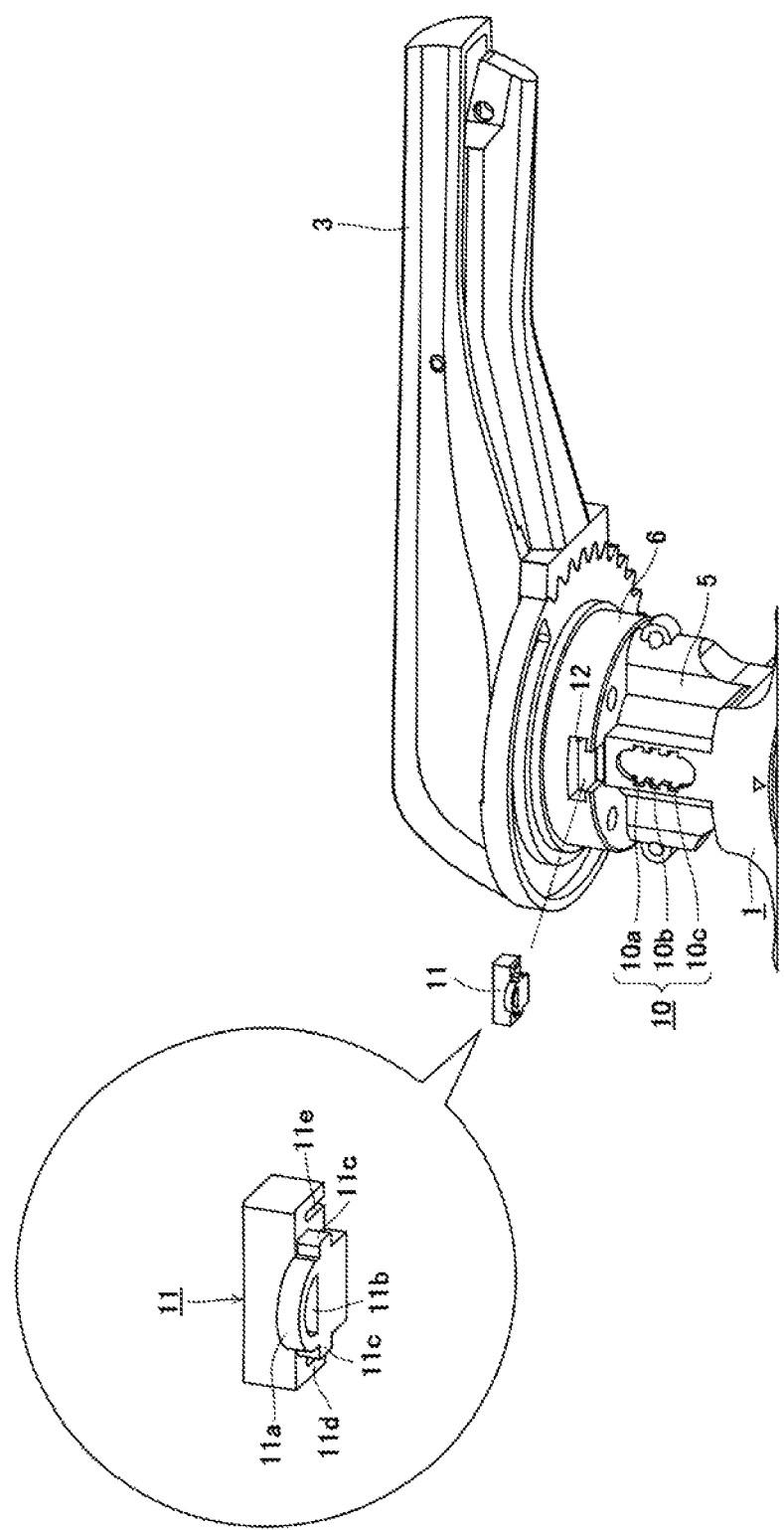

[fig.5]
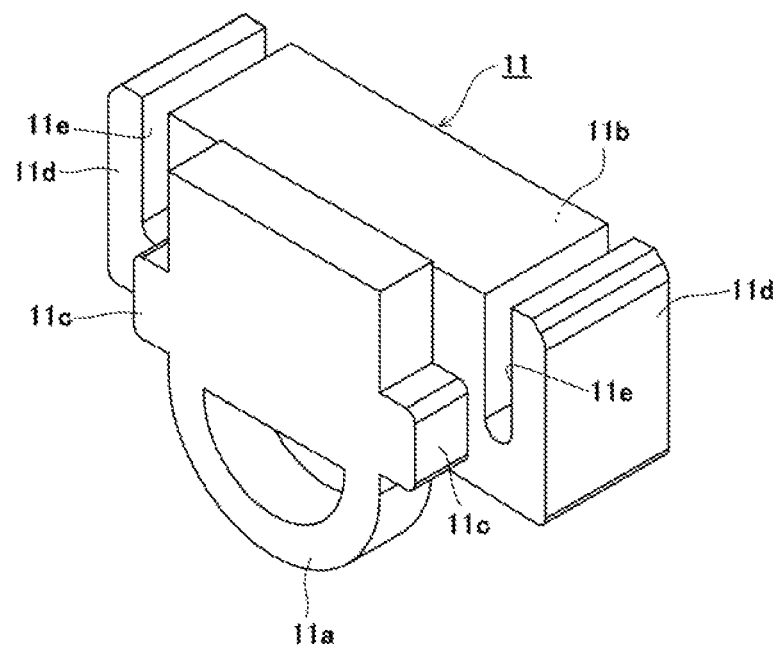

[fig.6]
(a)
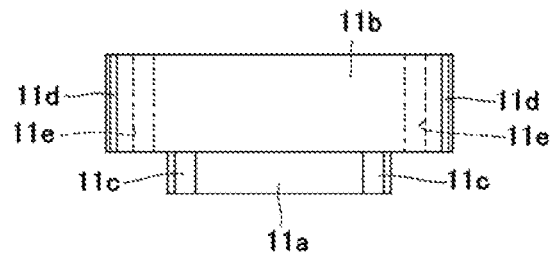
(b)
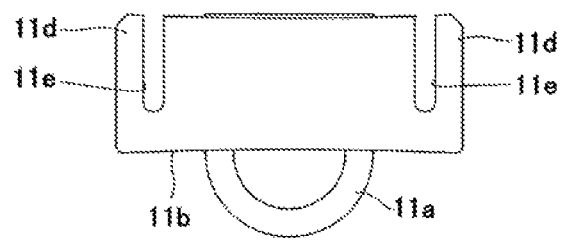
(c)
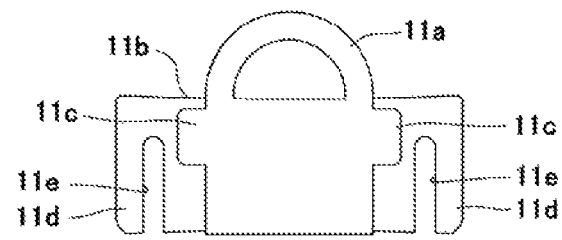
(d)
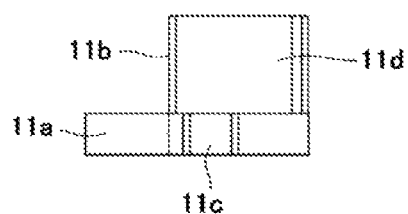

[fig.7]
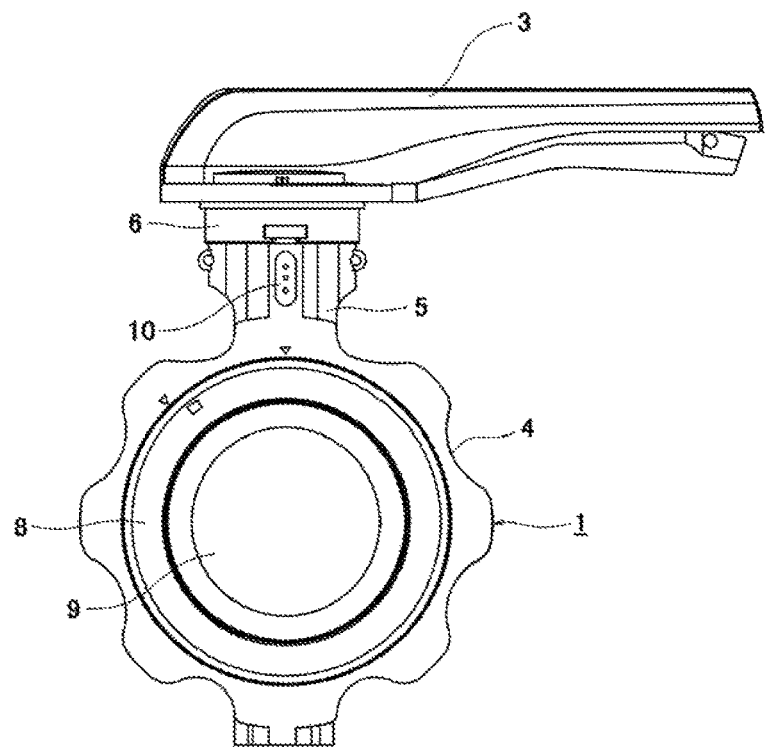
[fig.8]
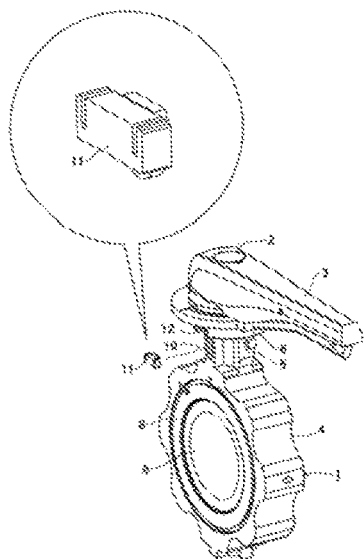

[fig.9]
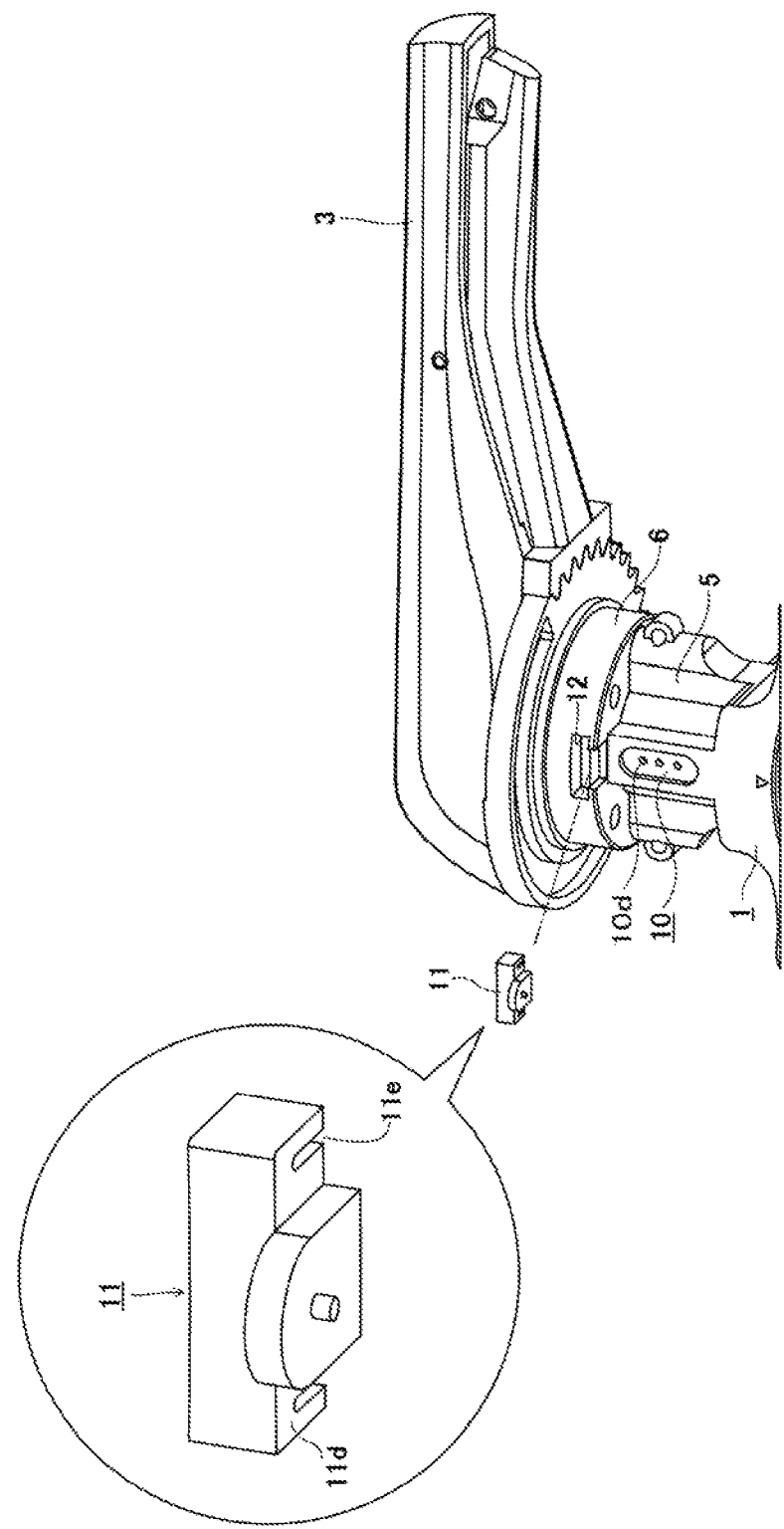

[fig.10]
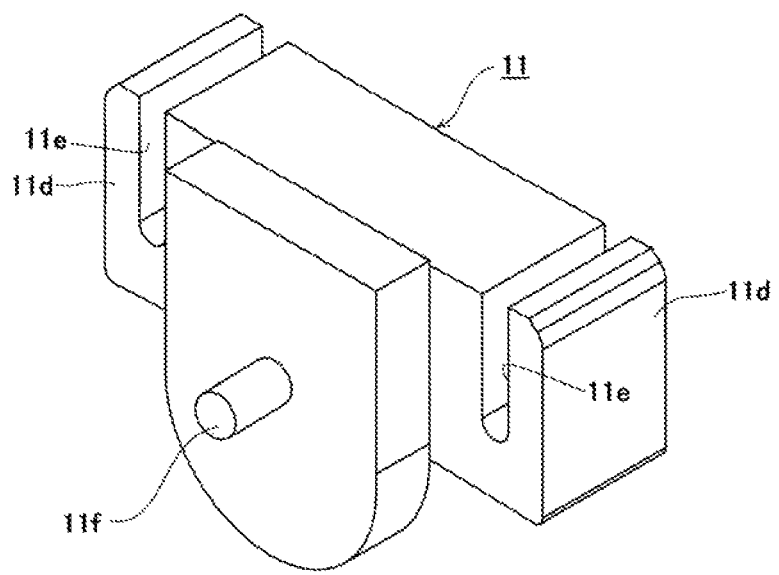

[fig.11]
(a)
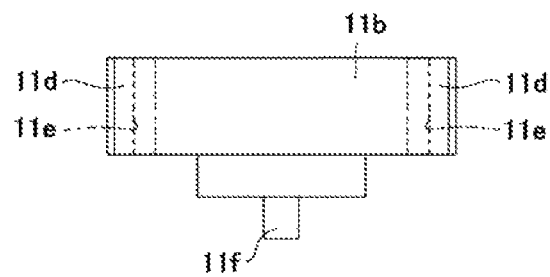
(b)
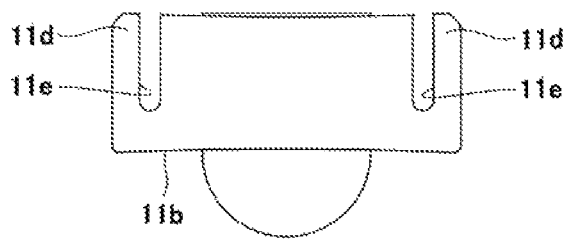
(c)
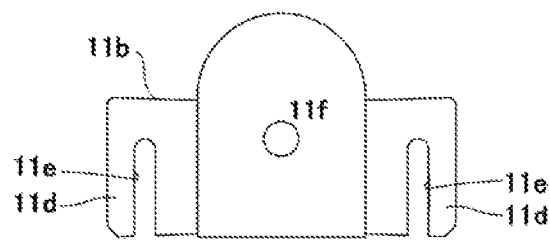
(d)
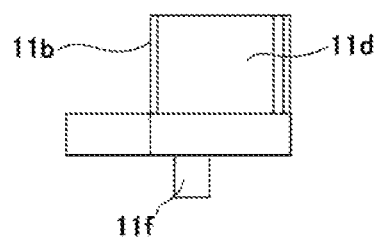

[fig.12]
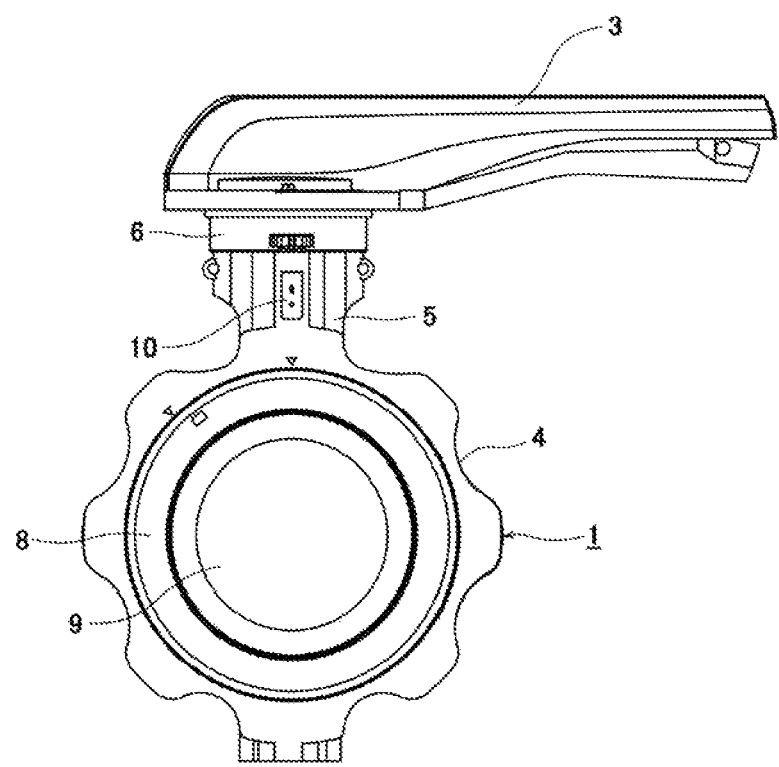

[fig.13]
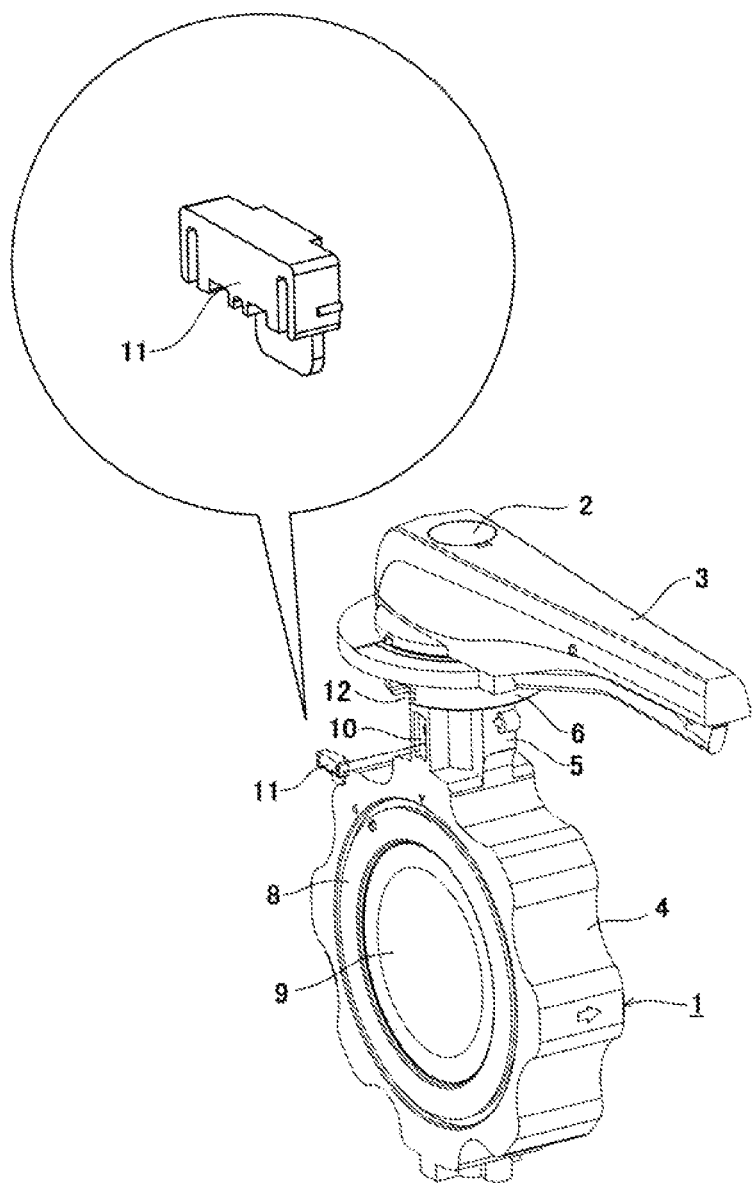

[fig.14]
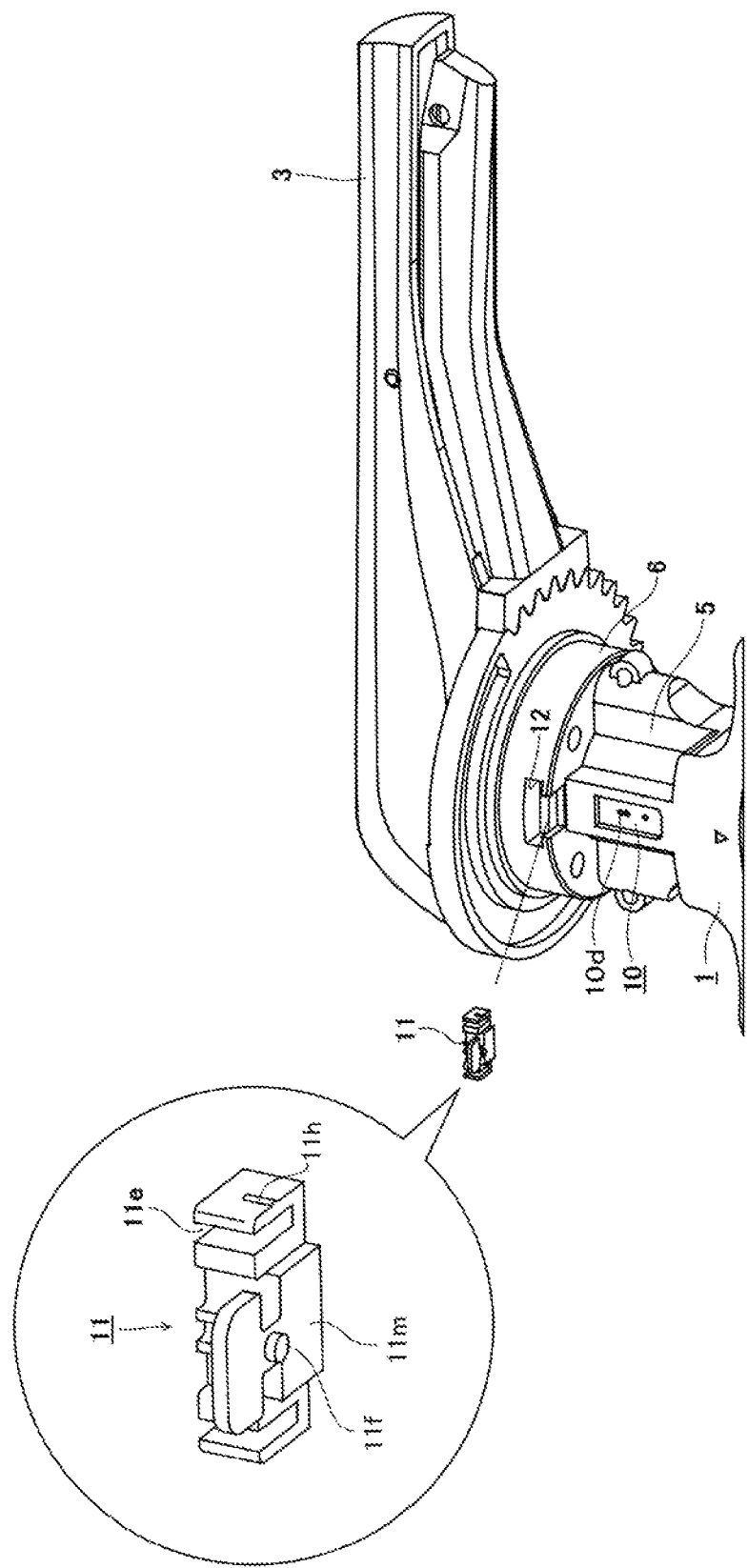

[fig.15]
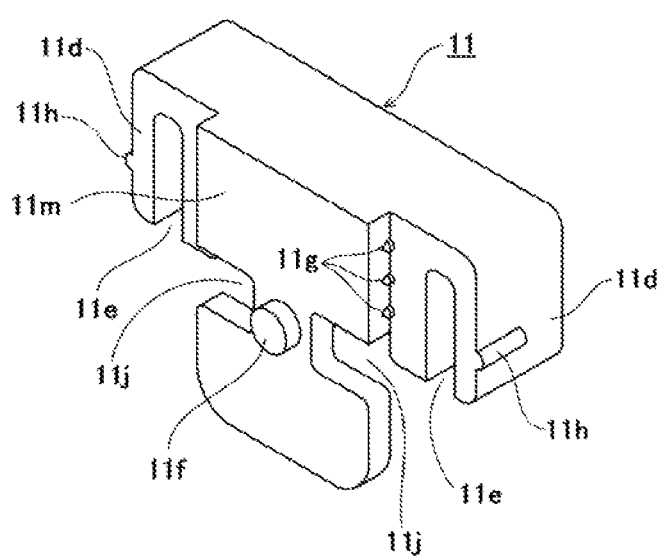

[fig.16]
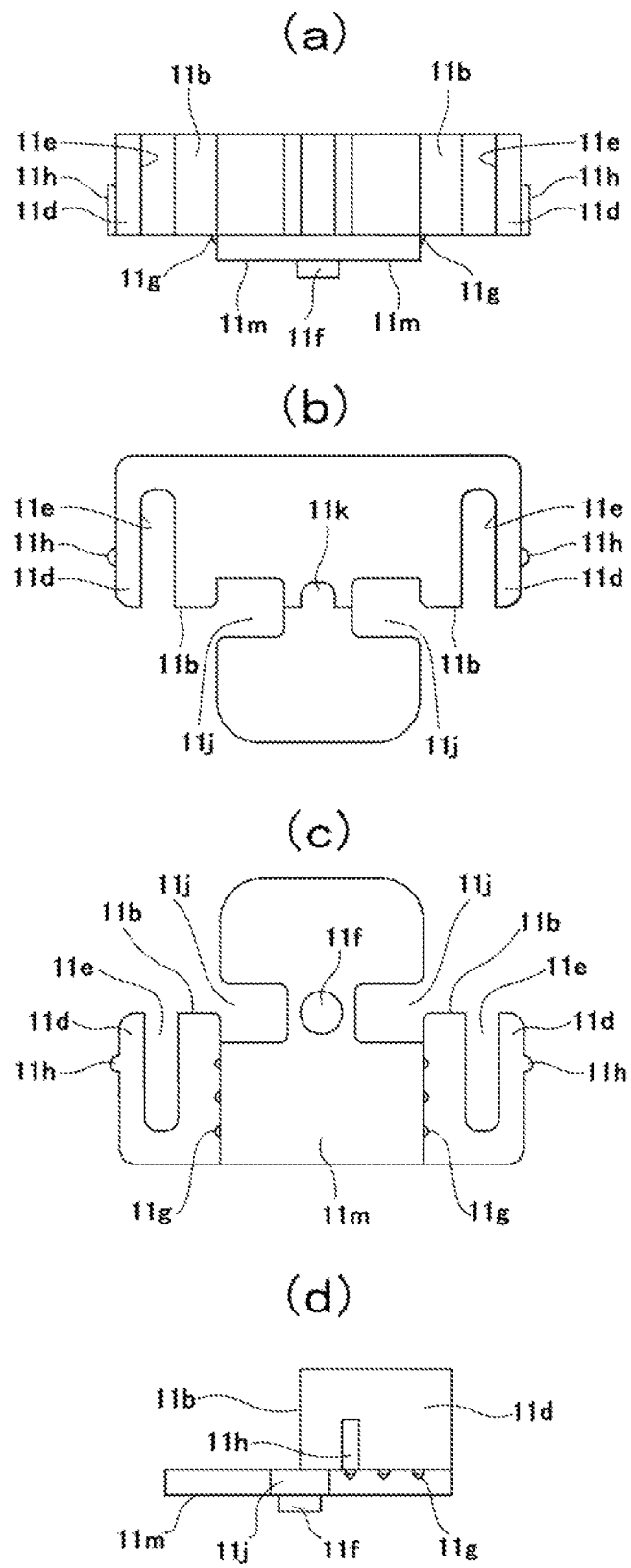

[fig.17]
(a)
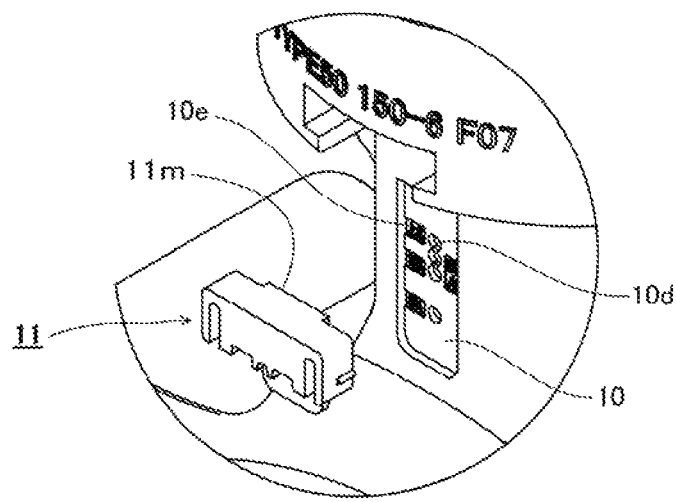
(b)
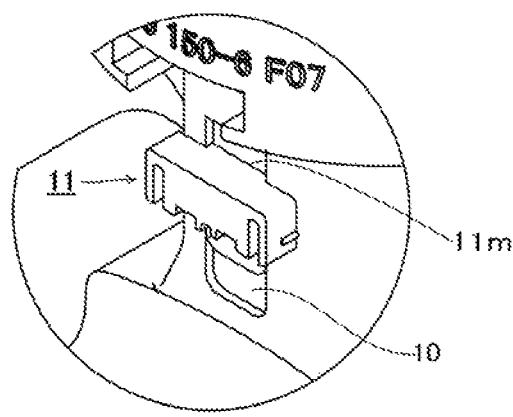
(c)
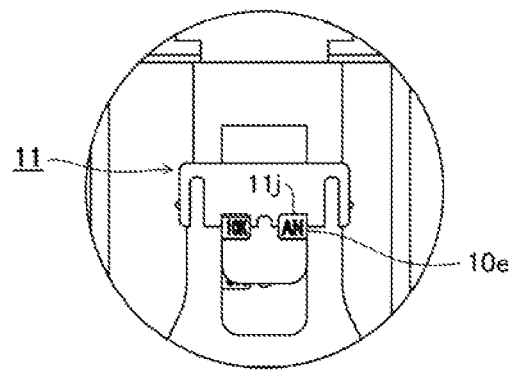

[fig.18]
(a)
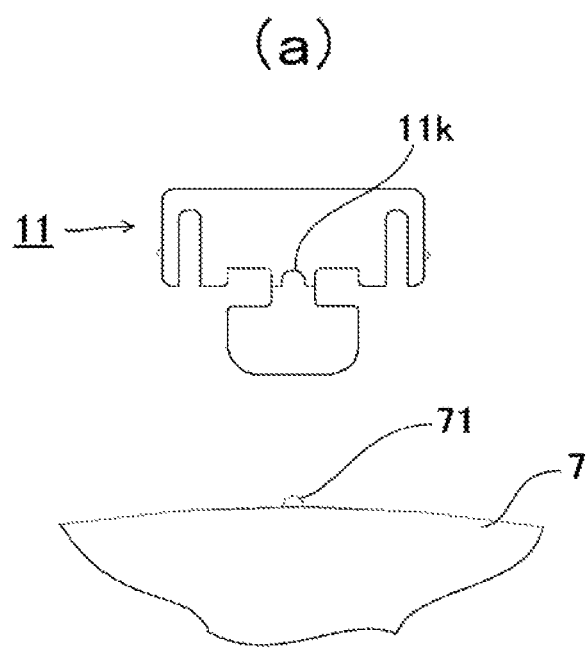
(b)
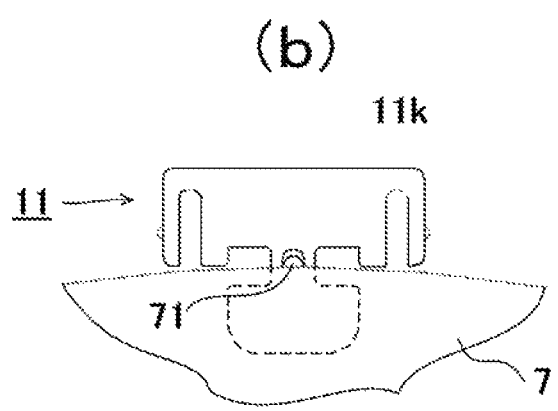

[fig.19]
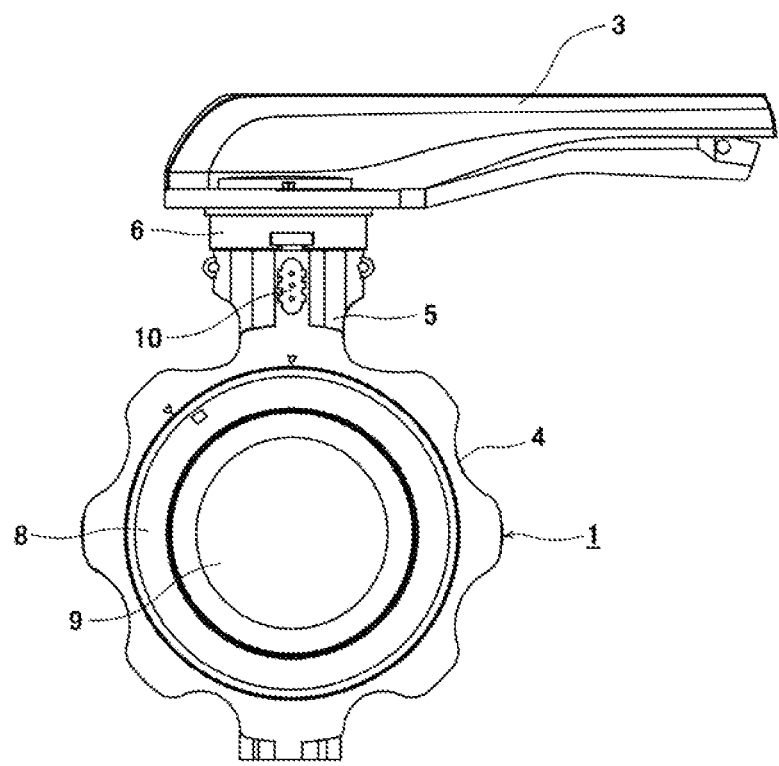

[fig.20]
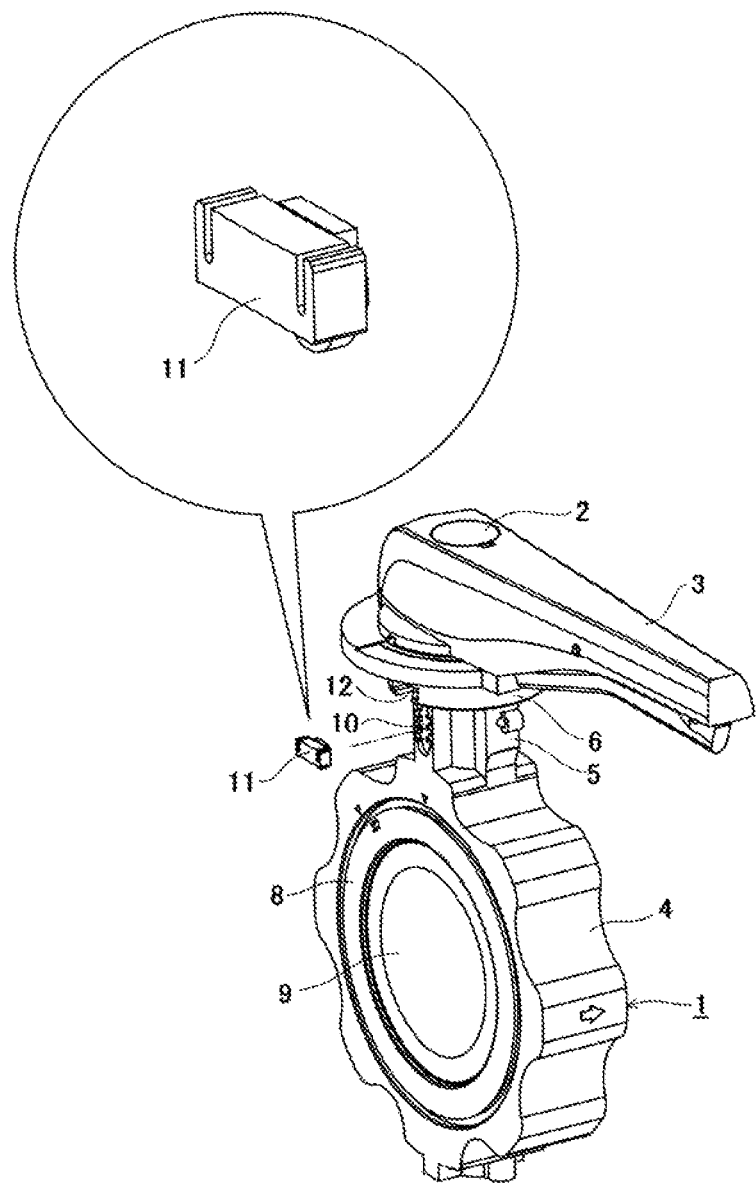

[fig.21]
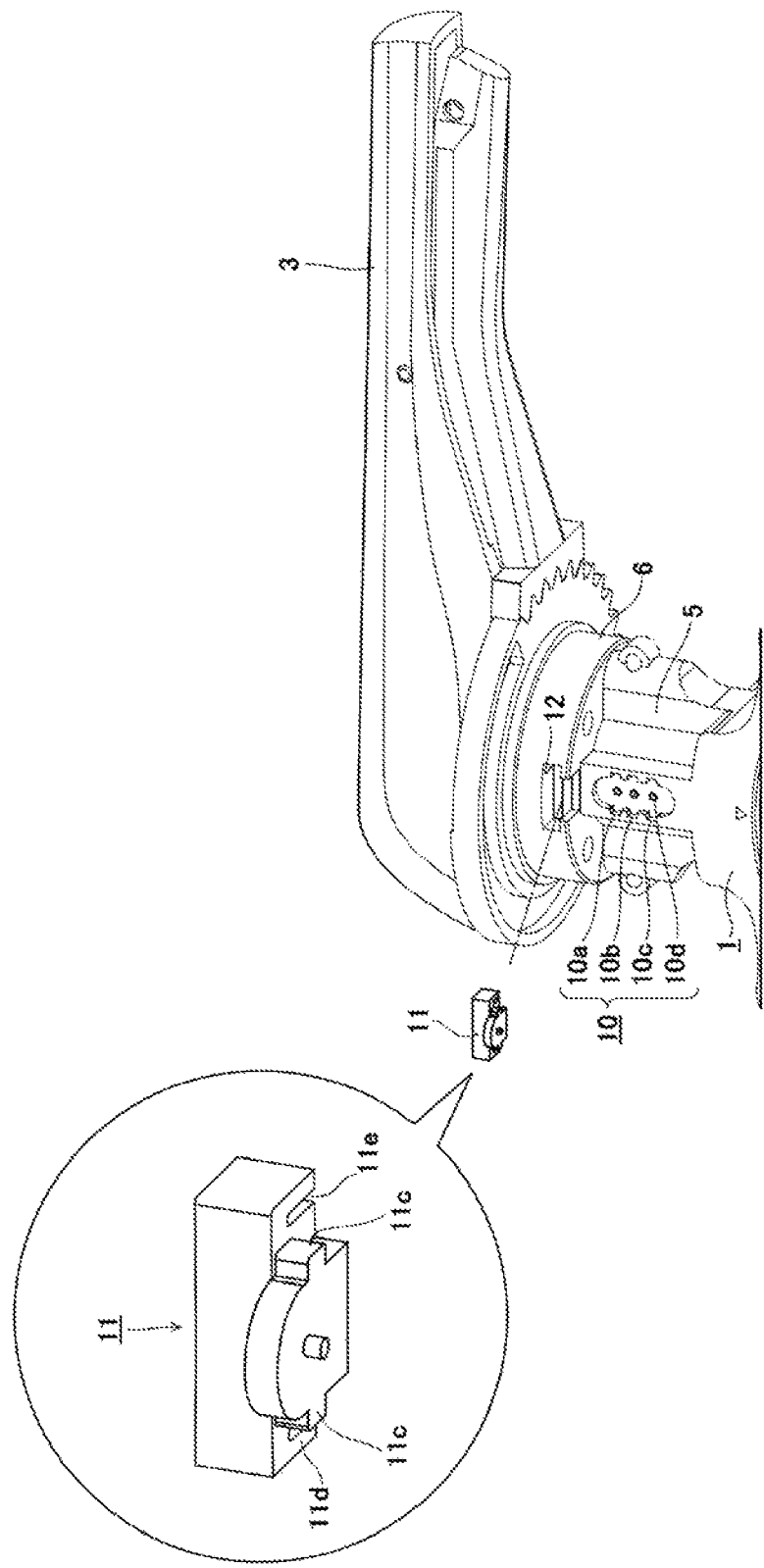

[fig.22]
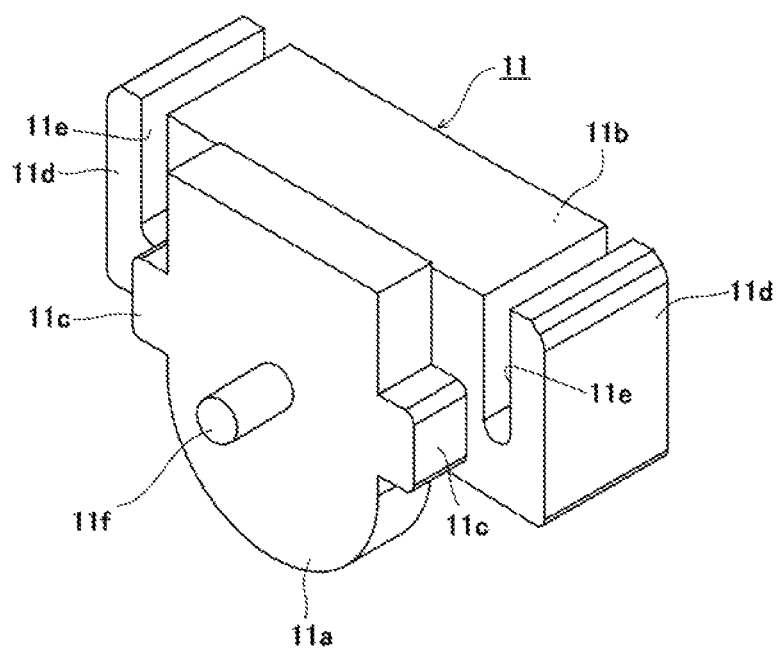

[fig.23]
(a)
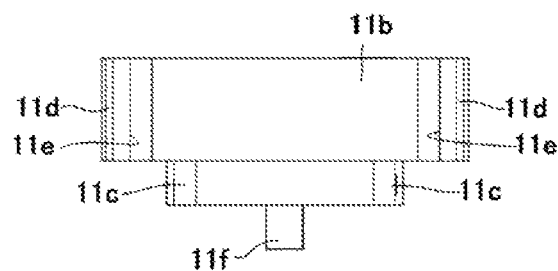
(b)
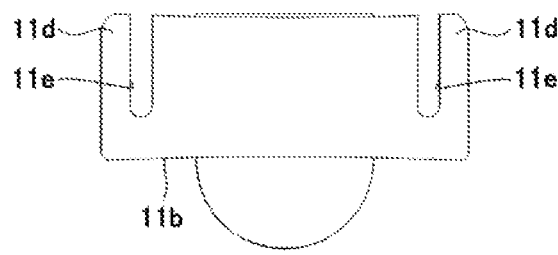
(c)
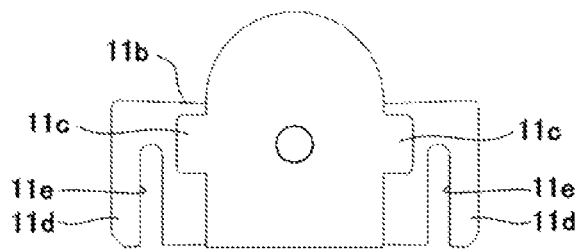
(d)
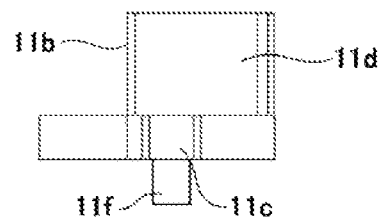

PIPE ALIGNMENT MECHANISM OF BUTTERFLY VALVE

TECHNICAL FIELD

The present invention relates to a butterfly valve suitably used for pipe lines of, e.g., chemical facilities, water and sewerage, and farming/fishing industries. More specifically, the present invention relates to a pipe alignment mechanism used for performing the centering process of aligning a pipe line for transport of various types of fluid and the center line of a wafer butterfly valve with each other upon installation of the butterfly valve on the pipe line, i.e., performing alignment.

BACKGROUND ART

When a butterfly valve is assembled with between two front and back pipes forming a fluid transport pipe line, alignment for aligning the center lines of these pipes and the center line of a valve box of the butterfly valve with each other needs to be performed. If such alignment is not accurately performed, there arise problems that sealability of a pipe flange portion is degraded, and that a valve body contacts an inner-diameter portion of the pipe in a valve fully-open state. For these reasons, countermeasures have been typically devised to easily perform alignment and smoothly perform plumbing upon installation of the butterfly valve.

Typically, a method in which a set collar is attached to the outer periphery of a bolt with reference to the height of the bolt to be connected and the outer periphery of a valve box is allocated on the collar and a method in which a semi-circular hook is provided at an upper portion of a valve box and is allocated on a bolt have been employed. The diameter of a bolt insertion hole is greater than a bolt diameter, and before fastening, a bolt is in an unstable state. For this reason, it is difficult to perform a centering process. Moreover, another method in which a sleeve-shaped positioning tool is attached to a top flange lower portion of a valve box and is allocated on a flange outer surface upon plumbing has been employed.

In the method in which the sleeve-shaped positioning tool is attached and is allocated on the pipe flange outer surface upon plumbing, an upper surface of a sleeve and a top flange lower surface of the valve box contact each other for positioning. For this reason, if a flange diameter changes due to a pipe connection standard change, a sleeve corresponding to a connection standard is necessary. This leads to lack of versatility and a larger component, resulting in a drawback in storage.

For example, Patent Literature 1 discloses a centering tool configured such that a main body is formed by a semi-cylindrical fitting portion fittable in a circular columnar valve stem bearing portion, which stands at the outer periphery of a cylindrical valve main body, from an upstream or downstream side of a pipe line and projecting portions projecting to both sides of the fitting portion, and cutout portions are each provided at lower ends of the projecting portions on both sides.

In this centering tool, an upper end of the semi-cylindrical fitting portion contacts a lower surface of a top flange fixed to an upper end of the valve stem bearing portion for the purpose of attachment of a valve stem actuator. In this state, bolts coupling upper end portions of pipe flanges fixed to end portions of two front and back pipes are fitted in the cutout portions of the lower ends of the projecting portions of the centering tool, and therefore, lowering of a butterfly valve is prevented. In this manner, alignment is performed.

Moreover, a centering tool is disclosed (see Patent Literature 2). The butterfly valve assembly centering tool detachably attached to a columnar valve stem bearing portion provided to protrude from an outer peripheral portion of a cylindrical valve main body and extending in a radial direction includes a main body to be fitted onto an outer surface of the valve stem bearing portion and a leg portion joined to a lower portion of the main body and projecting to at least one of an upstream or downstream side of a pipe line. It is configured such that when the centering tool is, together with a butterfly valve, inserted into between upstream and downstream pipe flanges facing each other in the pipe line such that the center lines of the pipe line and the valve main body are aligned with each other, a lower surface of the leg portion contacts the outer periphery of the pipe flange. Butterfly valve assembly centering can be easily and accurately performed by a single worker. In addition, detachment after butterfly valve assembly can be facilitated, and various standard sizes of the pipe flange are acceptable.

In addition, the following technique has been proposed (see Patent Literature 3). In a butterfly valve configured such that a disc (a valve body) provided in a short cylindrical valve box is rotatably provided, protruding pieces are provided on upper and lower sides at the outer periphery of the valve. At these protruding pieces, pipe bolt guide bolt contact portions which can accept various flange standards are formed. Of these bolt contact portions, the bolt contact portion on the lower side of the valve box is formed to open downward, and the bolt contact portion on the upper side is formed to open in a direction substantially crossing the bolt contact portion on the lower side. Thus, a centering process for the wafer butterfly valve and a pipe can be accurately and easily performed. Moreover, workability in plumbing can be improved, and a wide variety of flange standards is acceptable.

CITATION LIST

Patent Literature

PATENT LITERATURE 1: JP-UM-B-5-5349
PATENT LITERATURE 2: JP-A-2002-161987
PATENT LITERATURE 3: JP-A-2007-177813

SUMMARY OF INVENTION

Problems to be Solved by Invention

The present invention has been also made in view of the above-described problems of the typical techniques, and an object of the present invention is to provide a pipe alignment mechanism of a butterfly valve for which a positioning method and a positioning tool shape are devised so that favorable usability can be provided and an alignment process in plumbing can be easily performed.

Solutions to Problems

According to a first aspect of the present invention, in a pipe alignment mechanism of a butterfly valve detachably attached to a columnar valve stem bearing portion provided to protrude from an outer peripheral portion of a cylindrical valve main body and extending in a radial direction, a groove in which a positioning tool is fittable is provided at a top flange lower portion of a valve box. A groove end surface position is on a plane on which a pipe flange and the valve box are joined to each other. The groove has at least one insertion groove in which a fitting protrusion provided at the positioning tool is fittable. The at least one insertion groove is provided at different positions such that various flange connection standards are acceptable.

Moreover, according to a second aspect, in a pipe alignment mechanism of a butterfly valve detachably attached to a columnar valve stem bearing portion provided to protrude from an outer peripheral portion of a cylindrical valve main body and extending in a radial direction, a groove in which a positioning tool is fittable is provided at a top flange lower portion of a valve box. A groove end surface position is on a plane on which a pipe flange and the valve box are joined to each other. The groove has at least one hole in which a rod-shaped protrusion provided at the positioning tool is insertable. The at least one hole is provided at different positions such that various flange connection standards are acceptable. According to a third aspect, in a pipe alignment mechanism of a butterfly valve detachably attached to a columnar valve stem bearing portion provided to protrude from an outer peripheral portion of a cylindrical valve main body and extending in a radial direction, a groove in which a positioning tool is fittable is provided at a top flange lower portion of a valve box. A groove end surface position is on a plane on which a pipe flange and the valve box are joined to each other. The groove has at least one insertion groove in which a fitting protrusion provided at the positioning tool is fittable, and has at least one hole in which a rod-shaped protrusion provided at the positioning tool is insertable. The at least one hole and the at least one insertion groove are provided at different positions such that various flange connection standards are acceptable.

Further, according to a fourth aspect, the positioning tool includes a portion to be inserted and fitted in the groove and a portion configured to contact a pipe flange outer peripheral surface. According to a fifth aspect, a positioning tool housing portion is provided at the top flange.

According to a sixth aspect, the positioning tool includes a freely-expandable/contractable bayonet mechanism with a claw. According to a seventh aspect, the positioning tool has multiple protrusions on a surface configured to contact the groove and a surface configured to contact the tool housing portion.

For example, the material of the butterfly valve described herein includes, but not limited to, resin, metal, and ceramic. However, the material is preferably any one of PVC, PP, PVDF, and dicyclopentadiene. These materials are preferable because these materials are lightweight, are easily shaped or secondarily processed, and are widely used as a pipe material. Moreover, in the case of requiring high stiffness, metal such as copper, brass, cast iron, cast steel, carbon steel, stainless steel, titanium, aluminum, and aluminum die-cast steel is preferable. Particularly, stainless steel is more preferable because such a material is easily shaped or processed and is resistant to corrosion.

Effects of Invention

The present invention has the above-described structures, and the following excellent advantageous effects are obtained.

(1) Alignment in plumbing is allowed by the simple operation of fitting the positioning tool in the same shape in the groove provided at the valve box to cause the pipe flange outer peripheral surface to contact the pipe flange contact surface of the positioning tool. Moreover, the positioning tools in the same shape can accept various pipe connection standards, and therefore, high versatility can be provided.

(2) A butterfly valve assembly height is set with reference to the outer periphery of the pipe flange, and therefore, a centering process is more facilitated as compared to the typical centering tool with reference to a connection bolt of the pipe flange. Consequently, assembly can be accurately performed by a single worker.

(3) The positioning tool includes the freely-expandable/contractable bayonet mechanism with the claw, and therefore, attachment/detachment and re-use of the centering tool are allowed. Moreover, the positioning tool is compact and lightweight. Thus, the positioning tool can be housed in the top flange, leading to excellent workability and storability.

BRIEF DESCRIPTION OF DRAWINGS

FIG. 1 is a front view illustrating a butterfly valve according to a first embodiment of the present invention.

FIG. 2 is a perspective view illustrating a pipe alignment mechanism of the butterfly valve according to the first embodiment of the present invention.

FIG. 3 is a perspective view illustrating an installation state of the pipe alignment mechanism of the butterfly valve according to the first embodiment of the present invention.

FIG. 4 is an enlarged perspective view of a main portion of the pipe alignment mechanism according to the first embodiment of the present invention.

FIG. 5 is a perspective view illustrating a positioning tool according to the first embodiment of the present invention.

FIGS. 6(a) to 6(d) illustrate the positioning tool according to the first embodiment of the present invention, (a) being a front view, (b) being a plan view of (a), (c) being a bottom view of (a), (d) being a right-side view of (a).

FIG. 7 is a front view illustrating a butterfly valve according to a second embodiment of the present invention.

FIG. 8 is a perspective view illustrating a pipe alignment mechanism of the butterfly valve according to the second embodiment of the present invention.

FIG. 9 is an enlarged perspective view of a main portion of the pipe alignment mechanism according to the second embodiment of the present invention.

FIG. 10 is a perspective view illustrating a positioning tool according to the second embodiment of the present invention.

FIGS. 11(a) to 11(d) illustrate the positioning tool according to the second embodiment of the present invention, (a) being a front view, (b) being a plan view of (a), (c) being a bottom view of (a), (d) being a right-side view of (a).

FIG. 12 is a front view illustrating a butterfly valve according to a third embodiment of the present invention.

FIG. 13 is a perspective view illustrating a pipe alignment mechanism of the butterfly valve according to the third embodiment of the present invention.

FIG. 14 is an enlarged perspective view of a main portion of the pipe alignment mechanism according to the third embodiment of the present invention.

FIG. 15 is a perspective view illustrating a positioning tool according to the third embodiment of the present invention.

FIGS. 16(a) to 16(d) illustrate the positioning tool according to the third embodiment of the present invention, (a) being a front view, (b) being a plan view of (a), (c) being a bottom view of (a), (d) being a right-side view of (a).

FIGS. 17(a) to 17(c) illustrate a state in which the positioning tool according to the third embodiment of the present invention is housed in the butterfly valve, (a) illustrating a state before housing, (b) being a perspective view after housing, and (c) being a front view after housing.

FIGS. 18(a) and 18(b) are views for describing a relationship between the positioning tool and a flange according to the third embodiment of the present invention.

FIG. 19 is a front view illustrating a butterfly valve according to a fourth embodiment of the present invention.

FIG. 20 is a perspective view illustrating a pipe alignment mechanism of the butterfly valve according to the fourth embodiment of the present invention.

FIG. 21 is an enlarged perspective view of a main portion of the pipe alignment mechanism according to the fourth embodiment of the present invention.

FIG. 22 is a perspective view illustrating a positioning tool according to the fourth embodiment of the present invention.

FIGS. 23(a) to 23(d) illustrate the positioning tool according to the fourth embodiment of the present invention, (a) being a front view, (b) being a plan view of (a), (c) being a bottom view of (a), (d) being a right-side view of (a).

DESCRIPTION OF EMBODIMENTS

Hereinafter, a first embodiment in the present invention will be described with reference to the drawings. However, the present invention is not limited to the present embodiment, needless to say.

As illustrated in FIGS. 1 and 2, a main body of a butterfly valve in the first embodiment of the present invention is a substantially short cylindrical valve box 1, and multiple pipe bolt guide recesses 4 are provided at an outer peripheral portion of the valve box 1 as a resin molded product (made of PP). A process leaving waves of concavity and convexity is performed on the periphery of the valve box 1 as described above, and therefore, stiffness can be enhanced and a function as a pipe bolt guide can be fully fulfilled. The material of the valve box 1 may be other metal materials than resin, such as aluminum die-cast metal and stainless steel. A mount portion 5 on which an upper stem 2 for attaching a handle lever 3 is mounted is provided at an upper portion of the valve box 1, and the handle lever 3 and a valve stem actuator (not shown) attachment top flange 6 are formed integrally with an upper end of the mount portion 5 to project from the entire periphery of the mount portion 5. Note that in the figure, 8 indicates a seat ring and 9 indicates a valve body.

In FIG. 3, 7 indicates pipe flanges forming a fluid transport pipe line and fixed to end portions of two upstream and downstream pipes adjacent to each other. After the valve box 1 of the butterfly valve has been inserted into between these two pipe flanges 7 from above, fastening bolts (not shown) are inserted into regular bolt holes 7a opening at the pipe flanges 7, and are fastened with nuts being fitted onto tip ends of the fastening bolts. In this manner, the valve box 1 is sandwiched between two pipe flanges 7.

The handle lever 3 or a valve stem actuator (not shown) mounted on the top flange 6 formed at the upper end of the mount portion 5 of the valve box 1 can be fixed to the top flange 6 with multiple bolts inserted from below.

As illustrated in FIG. 4, an insertion groove 10 into which a positioning tool 11 is to be inserted is provided below the top flange 6, and an end surface position of the insertion groove 10 is on a plane on which the flange 7 and the valve box 1 are joined to each other. The insertion groove 10 into which the positioning tool 11 is to be inserted is drilled in an elongated oval shape, and groove step portions 10a, 10b, 10c projecting in both directions of a lateral direction are formed at multiple positions of the insertion groove 10 so that the insertion groove 10 can accept various flange connection standards.

The positioning tool 11 is inserted into any of the groove step portions 10a, 10b, 10c of the insertion groove 10. The positioning tool 11 includes protrusions 11c to be fitted in each groove step portion and a surface 11b configured to contact an outer peripheral surface of the flange 7. The positioning tools 11 in the same shape allow alignment upon installation according to various pipe connection standards. In the figure, 11a indicates a ring-shaped handle. Although the groove step portions 10a, 10b, 10c and the protrusions 11c are illustrated to have rectangular sections, these sections may be in a polygonal prism shape or a semi-circular shape as long as fitting can be performed.

The positioning tool 11 can be housed in a tool housing portion 12 of the top flange 6 after alignment has been performed or when the positioning tool 11 is not necessary. The positioning tool 11 includes a freely-expandable/contractable bayonet mechanism with claws 11d and clearances 11e. Thus, the positioning tool 11 can be easily and reliably housed in the tool housing portion 12, and attachment/detachment and re-use of the positioning tool 11 can be facilitated.

Next, a second embodiment in the present invention will be described with reference to the drawings. However, the present invention is not limited to the present embodiment, needless to say. The same reference numerals are used to represent those having configurations similar to those of the first embodiment.

As illustrated in FIGS. 7 and 8, a main body of a butterfly valve in the second embodiment of the present invention is a substantially short cylindrical valve box 1, and multiple pipe bolt guide recesses 4 are provided at an outer peripheral portion of the valve box 1 as a resin molded product (made of PP). A process leaving waves of concavity and convexity is performed on the periphery of the valve box 1 as described above, and therefore, stiffness can be enhanced and a function as a pipe bolt guide can be fully fulfilled. The material of the valve box 1 may be other metal materials than resin, such as aluminum die-cast metal and stainless steel. A mount portion 5 on which an upper stem 2 for attaching a handle lever 3 is mounted is provided at an upper portion of the valve box 1, and the handle lever 3 and a valve stem actuator (not shown) attachment top flange 6 are formed integrally with an upper end of the mount portion 5 to project from the entire periphery of the mount portion 5. Note that in the figure, 8 indicates a seat ring and 9 indicates a valve body. An installation state is similar to that of the first embodiment, and therefore, description thereof will be omitted.

As illustrated in FIG. 9, an insertion groove 10 into which a positioning tool 11 is to be inserted is provided below the top flange 6, and an end surface position of the groove 10 is on a plane on which a flange 7 and the valve box 1 are joined to each other. The insertion groove 10 into which the positioning tool 11 is to be inserted is drilled in an elongated oval shape, and groove holes 10d into which a later-described rod-shaped protrusion 11f is to be inserted are formed at multiple positions of the insertion groove 10 so that the insertion groove 10 can accept various flange connection standards.

The positioning tool 11 is inserted into any of the groove holes 10d of the insertion groove 10. The positioning tool 11 includes the rod-shaped protrusion 11f to be fitted in the groove hole 10d and a surface 11b configured to contact an outer peripheral surface of the flange 7. The positioning tools 11 in the same shape allow alignment upon installation according to various pipe connection standards. Although the groove holes 10*d* and the rod-shaped protrusion 11*f* are illustrated as a cylindrical shape, these portions may have polygonal prism-shaped sections, elliptic cylindrical sections, or semi-cylindrical sections as long as fitting can be performed.

The positioning tool 11 can be housed in a tool housing portion 12 of the top flange 6 after alignment has been performed or when the positioning tool 11 is not necessary. The positioning tool 11 includes a freely-expandable/contractable bayonet mechanism with claws 11*d* and clearances 11*e*. Thus, the positioning tool 11 can be easily and reliably housed in the tool housing portion 12, and attachment/detachment and re-use of the positioning tool 11 can be facilitated.

Next, a third embodiment in the present invention will be described with reference to the drawings. However, the present invention is not limited to the present embodiment, needless to say. The same reference numerals are used to represent those having configurations similar to those of the above-described embodiments.

As illustrated in FIGS. 12 and 13, a main body of a butterfly valve in the third embodiment of the present invention is a substantially short cylindrical valve box 1, and multiple pipe bolt guide recesses 4 are provided at an outer peripheral portion of the valve box 1 as a resin molded product (made of PP). A process leaving waves of concavity and convexity is performed on the periphery of the valve box 1 as described above, and therefore, stiffness can be enhanced and a function as a pipe bolt guide can be fully fulfilled. The material of the valve box 1 may be other metal materials than resin, such as aluminum die-cast metal and stainless steel. A mount portion 5 on which an upper stem 2 for attaching a handle lever 3 is mounted is provided at an upper portion of the valve box 1, and the handle lever 3 and a valve stem actuator (not shown) attachment top flange 6 are formed integrally with an upper end of the mount portion 5 to project from the entire periphery of the mount portion 5. Note that in the figure, 13 indicates a seat ring and 9 indicates a valve body. An installation state is similar to that of the first embodiment, and therefore, description thereof will be omitted.

As illustrated in FIG. 14, an insertion groove 10 into which a positioning tool 11 is to be inserted is provided below the top flange 6, and an end surface position of the insertion groove 10 is on a plane on which a flange 7 and the valve box 1 are joined to each other. The insertion groove 10 into which the positioning tool 11 is to be inserted is drilled in such an elongated polygonal shape that a top flange 6 side is flat and the other end side has corner portions, and groove holes 10*d* into which a later-described rod-shaped protrusion 11*f* is to be inserted are formed at multiple positions of the insertion groove 10 so that the insertion groove 10 can accept various flange connection standards. Although the groove holes 10*d* and the rod-shaped protrusion 11*f* are illustrated as a cylindrical shape, these portions may have polygonal prism-shaped sections, elliptic cylindrical sections, or semi-cylindrical sections as long as fitting can be performed.

The positioning tool 11 is inserted into any of the groove holes 10*d* of the insertion groove 10. The positioning tool 11 includes the rod-shaped protrusion 11*f* to be fitted in the groove hole 10*d* and a surface 11*b* configured to contact an outer peripheral surface of the flange 7. The positioning tools 11 in the same shape allow alignment upon installation according to various pipe connection standards.

The positioning tool 11 can be housed in a tool housing portion 12 of the top flange 6 after alignment has been performed or when the positioning tool 11 is not necessary. The positioning tool 11 includes a freely-expandable/contractable bayonet mechanism with claws 11*d* and clearances 11*e*. Thus, the positioning tool 11 can be easily and reliably housed in the tool housing portion 12, and attachment/detachment and re-use of the positioning tool 11 can be facilitated. In the above-described embodiments, the clearance 11*e* is formed to extend from a back side to a front side of the positioning tool 11. However, in the present embodiment, the clearance 11*e* is formed to extend from the front side to the back side of the positioning tool 11.

As illustrated in FIG. 15, a fitting portion 11*m* protruding from a bottom surface to fit in the insertion groove 10 is provided at the positioning tool 11. Multiple press-fitting small protrusions 11*g* are provided on both sides of the fitting portion 11*m*. Thus, it is configured such that the positioning tool 11 is not easily detached when the fitting portion 11*m* is inserted into the insertion groove 10. Retaining protrusions 11*h* are provided on both side surfaces of the positioning tool 11. As illustrated in FIG. 14, when the positioning tool 11 is housed in the tool housing portion 12, the retaining protrusions 11*h* contact the insertion groove 10 to press the claws 11*d* inwardly of the positioning tool 11, and therefore, the bayonet mechanism can more strongly function to prevent detachment of the positioning tool 11. A relief groove 11*k* is provided on a flat side of the positioning tool 11. As illustrated in FIG. 18(*a*), multiple angle indication protrusions 71 are, for the purpose of alignment with marks provided at a pipe, provided at the pipe flange 7 so that the angle of a flange bolt hole and the angle of a coupling can be easily adjusted. As illustrated in FIG. 18(*b*), the relief groove 11*k* prevents contact between the angle indication protrusion 71 and the positioning tool 11.

As illustrated in FIG. 17, multiple standard marks 10*e* are engraved in the insertion groove 10. Cutout portions 11*j* are provided at the fitting portion 11*m* so that the standard marks 10*e* can be viewed. The positions of the cutout portions 11*j* are determined according to a positional relationship among the rod-shaped protrusion 11*f* and the standard marks 10*e*.

Next, a fourth embodiment in the present invention will be described with reference to the drawings. However, the present invention is not limited to the present embodiment, needless to say. The same reference numerals are used to represent those having configurations similar to those of the above-described embodiments.

As illustrated in FIGS. 19 and 20, a main body of a butterfly valve in the fourth embodiment of the present invention is a substantially short cylindrical valve box 1, and multiple pipe bolt guide recesses 4 are provided at an outer peripheral portion of the valve box 1 as a resin molded product (made of PP). A process leaving waves of concavity and convexity is performed on the periphery of the valve box 1 as described above, and therefore, stiffness can be enhanced and a function as a pipe bolt guide can be fully fulfilled. The material of the valve box 1 may be other metal materials than resin, such as aluminum die-cast metal and stainless steel. A mount portion 5 on which an upper stem 2 for attaching a handle lever 3 is mounted is provided at an upper portion of the valve box 1, and the handle lever 3 and a valve stem actuator (not shown) attachment top flange 6 are formed integrally with an upper end of the mount portion 5 to project from the entire periphery of the mount portion 5. Note that in the figure, 20 indicates a seat ring and 9 indicates a valve body. An installation state is similar to that of the first embodiment, and therefore, description thereof will be omitted.

As illustrated in FIG. 21, an insertion groove 10 into which a positioning tool 11 is to be inserted is provided below the top flange 6, and an end surface position of the groove 10 is on a plane on which a flange 7 and the valve box 1 are joined to each other. The insertion groove 10 into which the positioning tool 11 is to be inserted is drilled in a shape similar to that of the first embodiment, and groove holes 10d into which a later-described rod-shaped protrusion 11f is to be inserted are formed at multiple positions of the insertion groove 10 so that the insertion groove 10 can accept various flange connection standards.

The positioning tool 11 is inserted into any of groove step portions 10a, 10b, 10c of the insertion groove 10 and the groove hole 10d corresponding thereto. The positioning tool 11 includes protrusions 11c to be fitted in each groove step portion, the rod-shaped protrusion 11f to be fitted in the groove hole 10d, and a surface 11b configured to contact an outer peripheral surface of the flange 7. The positioning tools 11 in the same shape allow alignment upon installation according to various pipe connection standards. Although the groove step portions 10a, 10b, 10c and the protrusions 11c are illustrated to have rectangular sections, these sections may be in a polygonal prism shape or a semi-circular shape as long as fitting can be performed. Further, although the groove holes 10d and the rod-shaped protrusion 11f are illustrated as a cylindrical shape, these portions may have polygonal prism-shaped sections, elliptic cylindrical sections, or semi-cylindrical sections as long as fitting can be performed.

The positioning tool 11 can be housed in a tool housing portion 12 of the top flange 6 after alignment has been performed or when the positioning tool 11 is not necessary. The positioning tool 11 includes a freely-expandable/contractable bayonet mechanism with claws 11d and clearances 11e. Thus, the positioning tool 11 can be easily and reliably housed in the tool housing portion 12, and attachment/detachment and re-use of the positioning tool 11 can be facilitated.

LIST OF REFERENCE SIGNS

1 Valve box
2 Stem
3 Handle lever
4 Guide recess
5 Mount portion
6 Top flange
7 Pipe flange
8 Seat ring
9 Valve body
10 Insertion groove of positioning tool
10d Groove hole
10e Standard mark
11 Positioning tool
11a Ring-shaped handle
11b Flange contact surface
11c Fitting protrusion
11d Claw
11e Clearance
11f Rod-shaped protrusion
11g Press-fitting small protrusion
11h Retaining protrusion
11j Cutout portion
11k Relief groove
11m Fitting portion
12 Tool housing portion
71 Angle indication protrusion

The invention claimed is:

1. A pipe alignment mechanism of a butterfly valve detachably attached to a columnar valve stem bearing portion provided to protrude from an outer peripheral portion of a cylindrical valve main body and extending in a radial direction, comprising
a groove provided at a top flange lower portion of a valve box such that a positioning tool is fittable in the groove, wherein
a groove end surface position is on a plane on which a pipe flange and the valve box are joined to each other,
the groove has at least one insertion groove in which a fitting protrusion provided at the positioning tool is fittable, and
the at least one insertion groove is provided at different positions such that various flange connection standards are acceptable.

2. The pipe alignment mechanism of the butterfly valve according to claim 1, wherein the positioning tool includes a portion to be inserted and fitted in the groove and a portion configured to contact a pipe flange outer peripheral surface.

3. The pipe alignment mechanism according to claim 2, wherein the positioning tool has multiple protrusions on a surface configured to contact the groove and a surface configured to contact the tool housing portion.

4. The pipe alignment mechanism according to claim 1, wherein a positioning tool housing portion is provided at a top flange.

5. The pipe alignment mechanism according to claim 4, wherein the positioning tool has multiple protrusions on a surface configured to contact the groove and a surface configured to contact the tool housing portion.

6. The pipe alignment mechanism according to claim 1, wherein the positioning tool includes a freely-expandable/contractable bayonet mechanism with a claw.

7. The pipe alignment mechanism according to claim 6, wherein the positioning tool has multiple protrusions on a surface configured to contact the groove and a surface configured to contact the tool housing portion.

8. A pipe alignment mechanism of a butterfly valve detachably attached to a columnar valve stem bearing portion provided to protrude from an outer peripheral portion of a cylindrical valve main body and extending in a radial direction, comprising
a groove provided at a top flange lower portion of a valve box such that a positioning tool is fittable in the groove, wherein
a groove end surface position is on a plane on which a pipe flange and the valve box are joined to each other,
the groove has at least one hole in which a rod-shaped protrusion provided at the positioning tool is insertable, and
the at least one hole is provided at different positions such that various flange connection standards are acceptable.

9. The pipe alignment mechanism of the butterfly valve according to claim 8, wherein the positioning tool includes a portion to be inserted and fitted in the groove and a portion configured to contact a pipe flange outer peripheral surface.

10. The pipe alignment mechanism according to claim 9, wherein the positioning tool has multiple protrusions on a surface configured to contact the groove and a surface configured to contact the tool housing portion.

11. The pipe alignment mechanism according to claim 8, wherein a positioning tool housing portion is provided at a top flange.

12. The pipe alignment mechanism according to claim 11, wherein the positioning tool has multiple protrusions on a surface configured to contact the groove and a surface configured to contact the tool housing portion.

13. The pipe alignment mechanism according to claim 8, wherein the positioning tool includes a freely-expandable/contractable bayonet mechanism with a claw.

14. The pipe alignment mechanism according to claim 13, wherein the positioning tool has multiple protrusions on a surface configured to contact the groove and a surface configured to contact the tool housing portion.

15. A pipe alignment mechanism of a butterfly valve detachably attached to a columnar valve stem bearing portion provided to protrude from an outer peripheral portion of a cylindrical valve main body and extending in a radial direction, comprising
a groove provided at a top flange lower portion of a valve box such that a positioning tool is fittable in the groove, wherein
a groove end surface position is on a plane on which a pipe flange and the valve box are joined to each other,
the groove has at least one insertion groove in which a fitting protrusion provided at the positioning tool is fittable, and has at least one hole in which a rod-shaped protrusion provided at the positioning tool is insertable, and
the at least one hole and the at least one insertion groove are provided at different positions such that various flange connection standards are acceptable.

16. The pipe alignment mechanism of the butterfly valve according to claim 15, wherein the positioning tool includes a portion to be inserted and fitted in the groove and a portion configured to contact a pipe flange outer peripheral surface.

17. The pipe alignment mechanism according to claim 16, wherein the positioning tool has multiple protrusions on a surface configured to contact the groove and a surface configured to contact the tool housing portion.

18. The pipe alignment mechanism according to claim 15, wherein a positioning tool housing portion is provided at a top flange.

19. The pipe alignment mechanism according to claim 18, wherein the positioning tool has multiple protrusions on a surface configured to contact the groove and a surface configured to contact the tool housing portion.

20. The pipe alignment mechanism according to claim 15, wherein the positioning tool includes a freely-expandable/contractable bayonet mechanism with a claw.

21. The pipe alignment mechanism according to claim 20, wherein the positioning tool has multiple protrusions on a surface configured to contact the groove and a surface configured to contact the tool housing portion.

* * * * *